United States Patent
Foley et al.

(10) Patent No.: US 8,782,465 B1
(45) Date of Patent: Jul. 15, 2014

(54) MANAGING DRIVE PROBLEMS IN DATA STORAGE SYSTEMS BY TRACKING OVERALL RETRY TIME

(75) Inventors: Robert P. Foley, Clinton, MA (US); Zhiqi Liu, Hopkinton, MA (US); Peter Puhov, Shrewsbury, MA (US); David W. Harvey, Newton Centre, MA (US); Wayne E. Garrett, Jr., Bellingham, MA (US)

(73) Assignee: EMC Corporation, Hopkinton, MA (US)

( * ) Notice: Subject to any disclaimer, the term of this patent is extended or adjusted under 35 U.S.C. 154(b) by 222 days.

(21) Appl. No.: 13/334,636

(22) Filed: Dec. 22, 2011

(51) Int. Cl.
*G06F 11/00* (2006.01)

(52) U.S. Cl.
USPC .................................. 714/6.22; 714/6.21

(58) Field of Classification Search
None
See application file for complete search history.

(56) References Cited

U.S. PATENT DOCUMENTS

| | | | | |
|---|---|---|---|---|
| 5,968,182 | A * | 10/1999 | Chen et al. | 714/5.11 |
| 6,076,142 | A * | 6/2000 | Corrington et al. | 711/114 |
| 7,971,093 | B1 * | 6/2011 | Goel et al. | 714/6.13 |
| 2002/0069377 | A1 * | 6/2002 | Mabuchi et al. | 714/42 |
| 2003/0163759 | A1 * | 8/2003 | Arakawa | 714/8 |
| 2005/0132103 | A1 * | 6/2005 | Yagisawa et al. | 710/36 |
| 2005/0283655 | A1 * | 12/2005 | Ashmore | 714/7 |
| 2006/0277445 | A1 * | 12/2006 | Kano et al. | 714/42 |
| 2007/0277059 | A1 * | 11/2007 | Ogawa | 714/54 |
| 2009/0271657 | A1 * | 10/2009 | McCombs et al. | 714/6 |
| 2011/0154134 | A1 * | 6/2011 | Kohada | 714/54 |

* cited by examiner

*Primary Examiner* — Gabriel Chu
(74) *Attorney, Agent, or Firm* — Krishnendu Gupta; Jason A. Reyes

(57) ABSTRACT

A method is used in managing drive problems in data storage systems. It is determined, by a physical drive object, whether an I/O with a drive is able to be retried by another object. An overall retry time for the I/O is tracked. If the overall retry time is excessive, the drive is taken offline.

18 Claims, 3 Drawing Sheets

MANAGING DRIVE PROBLEMS IN DATA STORAGE SYSTEMS BY TRACKING OVERALL RETRY TIME

BACKGROUND

1. Technical Field

This application generally relates to managing drive problems in data storage systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Disk drives are used as primary data storage devices in data storage systems and other modern computer systems and networks. While very reliable, today's disk drives occasionally fail. In addition to causing computer system downtime, such disk drive failures can result in the loss of some or all of the data stored in the disk drive. Accordingly, disk drives commonly perform Predictive Failure Analysis (PFA) using Self-Monitoring, Analysis and Reporting Technology (SMART), to predict disk drive failure caused by the gradual decay of electrical and/or mechanical components of the disk drive. The primary goal of PFA is to predict when disk drive failure is imminent to allow the data stored in the disk drive to be archived.

PFA is generally performed during the operation of the disk drive by monitoring key disk drive attributes that are indicative of the health of the disk drive. Additionally PFA can be implemented by performing periodic self-diagnostic tests on the disk drive. Present methods of performing PFA in disk drives will predict imminent disk drive failure based upon errors associated with a single attribute (e.g., read errors, seek errors, fly-height errors, etc.). In these methods, errors corresponding to the single attribute are monitored and compared to a threshold value. When the errors exceed the threshold, a warning of imminent disk drive failure is provided to the user.

SUMMARY OF THE INVENTION

A method is used in managing drive problems in data storage systems. It is determined, by a physical drive object, whether an I/O with a drive is able to be retried by another object. An overall retry time for the I/O is tracked. If the overall retry time is excessive, the drive is taken offline.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
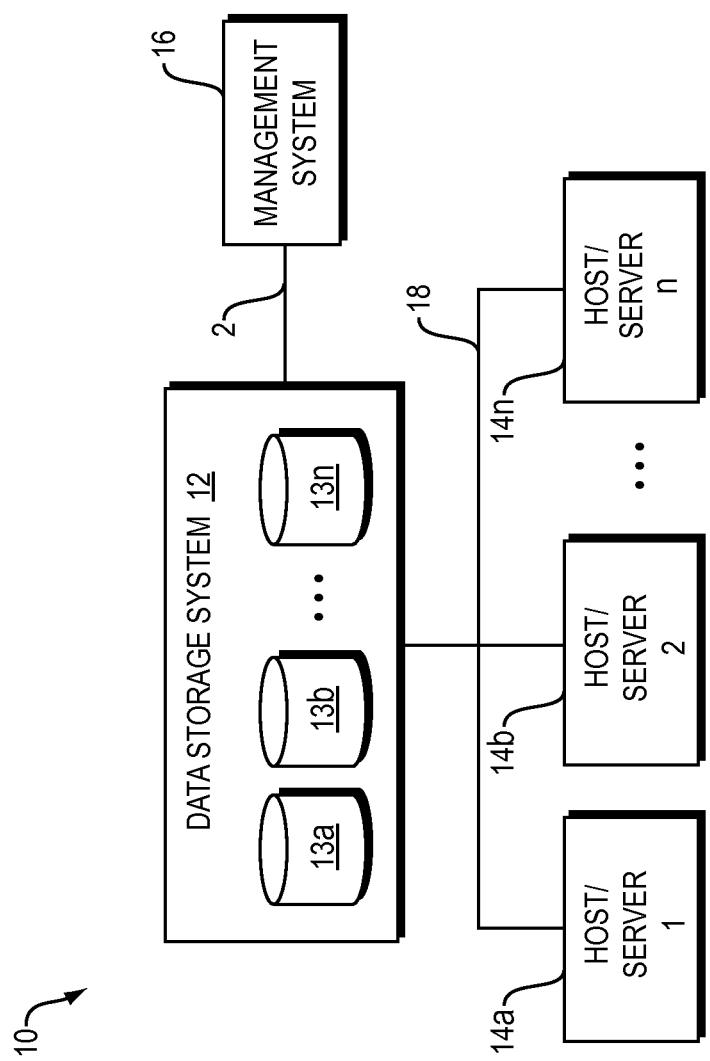
FIGS. 1-3 are examples of embodiments of a system that may utilize the techniques described herein.

Described below is a technique for use in managing drive problems in data storage systems. In at least one implementation, the technique may be used to help provide for RAID object and physical drive object retry error handling and drive health checking. For example, in at least one example implementation in accordance with the technique, a mechanism can be provided for a RAID object to handle error-producing events ("errors") that originate at a physical drive object and for the physical drive object to initiate a health check on a drive due to I/Os taking too long to a drive. In this mechanism the physical drive object indicates whether or not an error is able to be retried by the client (RAID object). When the error is retried, the mechanism keeps track of the overall retry time for this I/O. In the example implementation, the physical drive object is responsible for monitoring the total retry time (the time the drive has not been available for this I/O), and when the total retry time exceeds normal expectations for this type of drive, the physical drive object take the drive offline for a health check and the RAID object uses redundancy logic to process and complete I/Os. Accordingly, the example implementation greatly reduces delays for I/Os the RAID object is servicing when drives have problems. The health check on the drive of the example implementation is valuable at least because it performs self test and recovery actions to try to bring a drive back to normal. If in the example implementation the drive cannot perform the self test or the recovery actions do not bring the drive back, the drive is faulted as described below so that it can be replaced.

A conventional approach has a translation or shim module or level ("shim") in between the RAID object and the physical drive object, which shim has counters and limits for different types of errors. Conventionally whenever an error is detected by the shim, it determines whether a retry is needed or not depending on the threshold for that particular error. If conventionally the number of retries exceeds the limit, the drive is declared failed and is no longer used by the RAID object or logic. A disadvantage of the conventional approach is that there is no sense of time built into the retries—it is strictly counter based. Conventionally these counters are heuristically derived and thus it is not possible for the shim to adhere to any response time limit that the upstream RAID object requires. This conventional approach can be subject to system panics in some cases if drives take too long to respond since the shim does not fail a drive when it takes excessively long. Another disadvantage of the conventional approach is that the handling of errors is not inside the physical drive object, and therefore the interface between the physical drive object and the shim needs to include extensive details on the type of error. Conventionally this results in an interface that requires the shim to have comprehensive knowledge of different kinds of drive errors for different classes of drives and various retry policies for these drives.

By contrast, at least one implementation of the current technique may provide one or more of the following advantages. The physical drive has a simplified interface. The physical drive error that is returned up to the RAID object indicates what occurred and what action the client should take. Accordingly, for an I/O failure, the physical drive simply indicates that the I/O is failed and that the I/O either can or cannot be retried. If the I/O cannot be retried, the client stops using the drive. If the I/O can be retried, the physical drive object indicates how long the client should wait before retrying. Time is taken into consideration by keeping track of total I/O time. This allows the system to proactively handle a drive that is failing and thus taking a long time to respond. The physical drive object can determine whether the drive has taken too long to respond to a single I/O or across a set of retries of a given I/O. Another advantage is a health check such that the physical drive object can proactively initiate the health check to try to recover the drive. If this health check fails, the drive can be removed from the system. Removing faulty drives from the system helps prevent future delays or corruptions arising from this drive.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 2 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
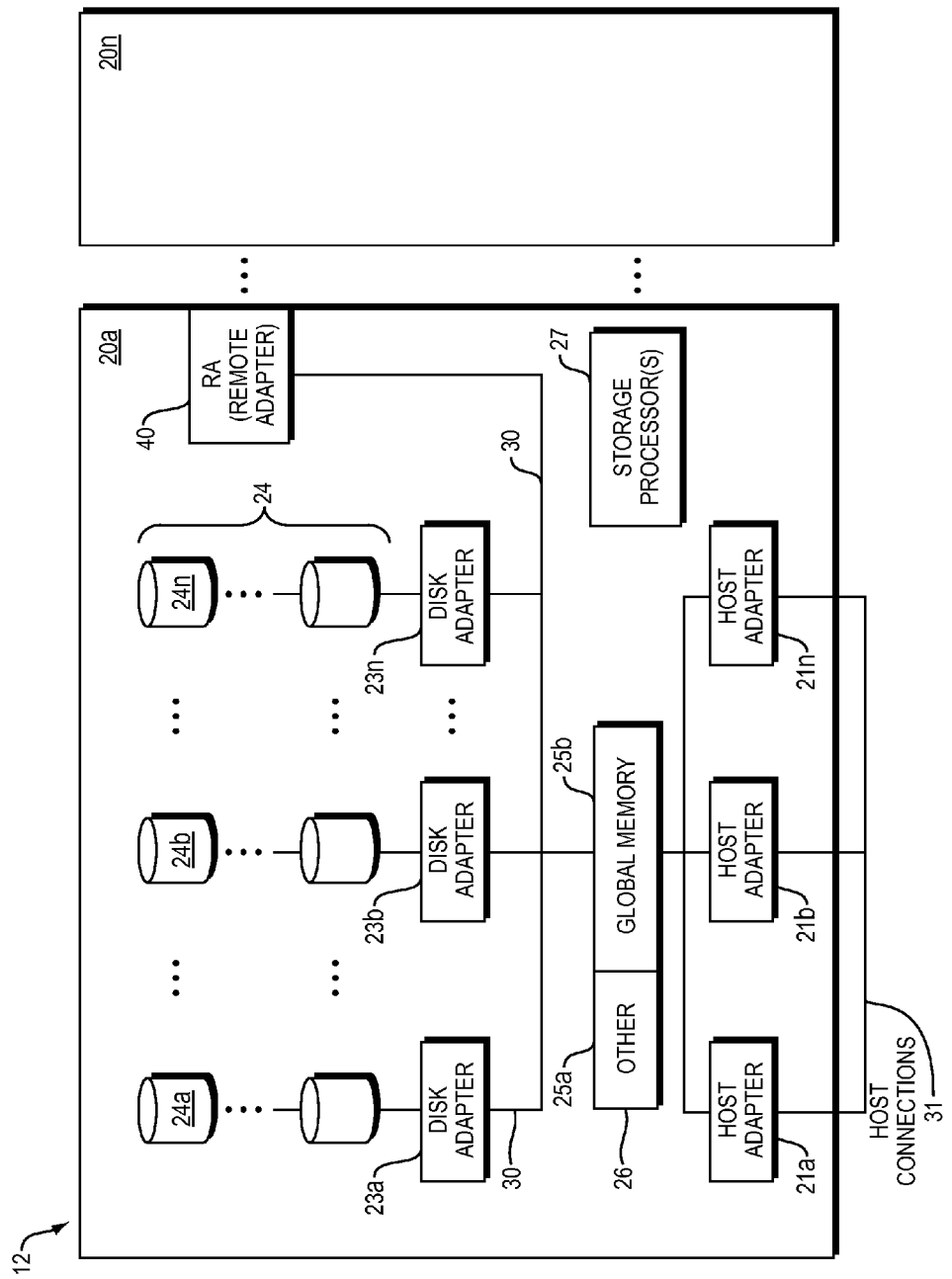

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the CLARiiON® data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

I/O operations performed in a data storage system may include I/O operations of a first type which are received by the data storage system from an external client, such as a host. I/O operations performed by the data storage system may also include other I/O operations of a second type which are not initiated by the host or other external client. Rather, these other I/O operations may be initiated from within the data storage system, such as by a backend component of the data storage system. I/O operations of this second type may be referred to as background I/O operations which are not executed in a context of a host I/O, or more generally, in a context of an external client I/O operation. Background I/O operations may include I/O operations performed in connection with, for example, monitoring and maintaining the data storage system such as repairing a RAID drive (e.g., read and/or write operations in connection with correcting corrupted user data and/or RAID parity information), performing an I/O operation to check on the status and proper functioning of a physical drive, initializing a physical drive by writing out a particular initialization value or pattern to physical drive portions, and the like.

Figure 3:
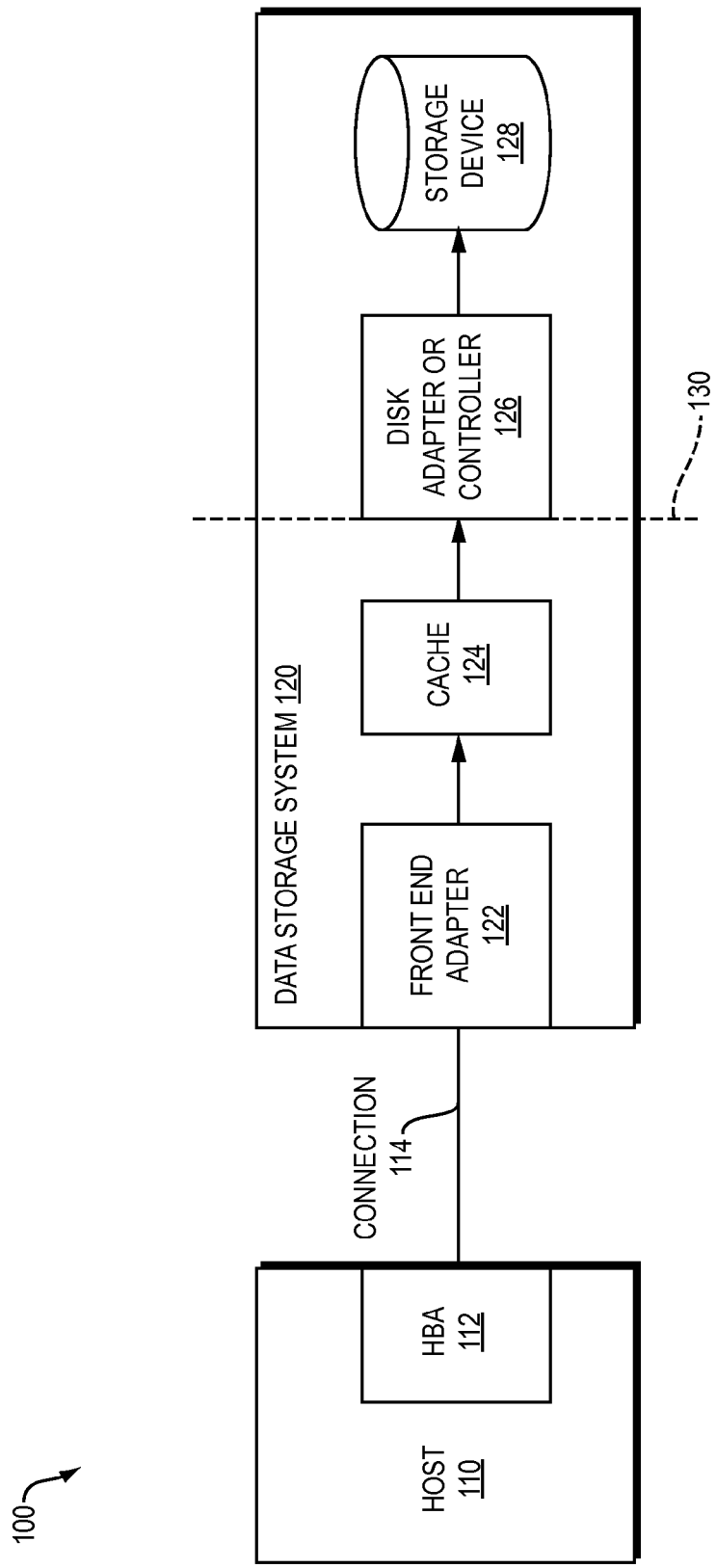

With reference to FIG. 3, shown is an example 100 illustrating components of a system that may be used in performing the different types of I/O operations in an embodiment in accordance with techniques herein. The example 100 includes a simplified view of components of a system as described above. The example 100 includes a host 110 with an HBA 112. The host 110 communicates with data storage system 120 over connection 114. Connection 114 may be, for example, a network connection between the HBA 112 and a front end adapter 122 of the data storage system 120. As described above, a front end adapter 122 may be, for example, an FA. The data storage system 120 also includes a cache 124, a DA or storage controller 126 and one or more physical storage devices 128 (e.g., disks or solid state devices (SSDs) such as a flash drive). The host 110 may issue an I/O operation to the data storage system over connection 114. For example, the host may issue a write operation to write data to a portion of storage device 128. In one embodiment, the data of the write operation may first be stored in cache 124 and then destaged at a later point in time by DA 126 to the physical storage device 128. The foregoing host write operation is an example of an I/O operation of the first type described above. The DA is an example of a backend data storage system component that may also initiate I/O operations. For example, the DA may initiate an I/O operation to periodically test or verify the health and status of the physical device 128. This latter I/O operation as initiated by the DA may be characterized as a background I/O operation described above which is not in the context of an I/O operation from the host or other client external to the data storage system. In such an embodiment, line 130 may represent an imaginary line within the system 120 partitioning the backend from the front end of the data storage system 120. In this embodiment, the background operations may be characterized as data storage system initiated operations and, more particularly, in some embodiments, such background operations may be initiated by a backend component such as a DA.

In a system such as a data storage system described above, there may be drive errors when performing the different types of I/O operations. Described in following paragraphs are processes that may be used in connection with managing drive problems in data storage systems.

In an example implementation in accordance with the technique, at least with respect to retry logic, a RAID object communicates directly with a physical drive object, and the RAID object executes retries after errors. (Technically, depending on the implementation, there may be one or more objects logically between the RAID object and the physical drive object, and each of these objects may have an edge connecting them, but these intervening objects do not affect or add to retry logic.) A simplified interface is provided between the RAID object and the physical drive object, such that the physical drive object may return an error and indicate whether or not the I/O is retryable.

Attention is paid to time such that, for example, when a retry is performed and a threshold on time is reached, the drive is taken offline (even if an error threshold on error type has not been reached), and rebuild logging is started, with the RAID group becoming degraded, so that an I/O does not time out and can complete back to a host in reasonable amount of time. In the example implementation, the physical drive object maintains retry counters, the RAID object performs retries, and the physical drive object and the RAID object coordinate to keep track of time.

As described below, a health check may be performed on a drive and if drive is bad, it is taken offline to get it out of the system.

The RAID object and the physical drive object have a connection between them, called an edge status or state, so when the physical drive object determines that it cannot process an I/O (thereby producing an I/O failure), it returns a not retryable status indication for the I/O, and if the physical drive object is no longer going to service I/Os, its edge state changes to a state where it is no longer able to process I/Os. The edge state is a connection between the RAID object and the physical drive object, and when the edge state changes, the RAID object detects that change, and also detects the I/O failure, and as a result of the change and the failure, the RAID object goes into degraded mode. In the degraded mode, the RAID object performs rebuild logging, and keeps track of areas to which write I/Os were directed, so that later when the edge state resets and a connection comes back as a result of the drive having been replaced or because the current drive came back, the RAID object can rebuild the data of the drive, at least those areas to which write I/Os were directed.

In an example process in accordance with the technique, the RAID object attempts to send down an I/O for processing to the physical drive object, and the physical drive object responds with an error and also indicates the RAID object can retry. In at least one implementation, the RAID object retries unless the RAID object detects a change in the edge state. The physical drive object indicates both whether the RAID object can retry, and also when the RAID object should retry (e.g., how long the RAID object should wait before retrying, which the RAID object uses to decide how long to delay to retry). The RAID object keeps track of time in at least two ways: the RAID object waits as long as the physical drive object specified before retrying, and the I/O's object packet also has in it a notion of time. When the I/O first starts out, a field in the packet called the physical drive service time (a milliseconds value) is set to zero. When the I/O is sent down to the physical drive object, the physical drive object updates the field when the physical drive object completes the I/O, to record how long the I/O spent at the physical drive object, and then the packet returns to the RAID object, which detects that the I/O was not successful and that retrying is possible. The RAID object waits the amount of time that the physical drive object has specified for the RAID object to wait before retrying. Also before retrying, the RAID object increases the physical drive service time by the amount of time the RAID object waited. Accordingly, the physical drive service time is the amount of time the I/O actually spent at the physical drive object plus any amount of time the physical drive object specified for the RAID object to wait, as the total amount of time the I/O was unable to be processed. After increasing the physical drive service time value in the packet to account for the amount of time the RAID object waited, the RAID object retries the I/O by sending the I/O back down to the physical drive object.

In at least some cases, a reason the physical drive object specifies that the RAID object should wait before retrying is that the error may be due to a condition that is not expected to be cleared right away, and therefore success is not likely if a retry is attempted right away. Thus the physical drive object determines that retrying is worthwhile but that the error, e.g., resulting from a problem with a transport from the physical drive object to the drive, or with drive itself, means that the RAID object needs to wait, in order to help avoid a situation in which a retrying attempt is unlikely to get any different response from the drive. Typical conditions that merit waiting include when the drive has taken a timeout, is busy, or is working on an internal recovery, and cannot process the I/O.

In at least some systems, the physical drive object may receive any of many different types of errors back from drive itself, including errors due to check conditions or port status from a miniport, and protocol or transport related errors. In many cases, the physical drive object's determination as to whether to specify retrying may be based on learned knowledge of drives, e.g., that the behavior of the drive is not likely to change, or interpretations of check conditions or sense codes from the drive, or interpretations of interactions with the miniport.

At least one implementation of the physical drive object performs retries itself only for media errors on write requests or write verify requests, to try to reassign blocks, and all other retries are performed by the RAID object.

Thus, in at least some implementations in accordance with the technique, the system proceeds according to the following process: the physical drive object attempts to fulfill the I/O request, and the I/O request either has success which is reported back by the physical drive object, or has an error, in which case the physical drive object interprets the error and then indicates to the RAID object a failure report, whether to retry, and if so how long to wait.

With respect to the health check, in general the health check is used to vet the drive and if necessary decide that the drive is no longer healthy, in which case the drive is specified as faulted so that upper levels of the system can try to get a spare drive into the RAID group.

The health check is initiated by the physical drive object, and a provision drive object in between the RAID object and the physical drive object coordinates the issuing of the health check. In particular, the physical drive object requests the health check by setting an attribute on an edge connection between the physical drive object and the provision drive object. The provision drive object detects that request and takes the drive off line so that the RAID object no longer detects the drive and performs rebuild logging as described above. The provision drive object coordinates the issuing of health check between the two storage processors. When the provision drive object detects the request that a health check is needed, the provision drive object takes the drive offline on both storage processors, by coordinating with the other storage processor, and then issues a request down to the physical drive object to indicate that the health check can now be commenced. The physical drive object on one storage processor performs the health check and vets the drive, and reports the result to the provision drive object. (The provision drive object coordinates actions between the two storage processors which are both communicating with the drive.) If the provisional drive object detects that the health check worked, the provisional drive object coordinates bringing the drive back online, which is detected by the RAID object which starts to rebuild as described above.

Thus, in at least some implementations in accordance with the technique, the system proceeds according to the following process: the physical drive object determines that a health check is needed, the provision drive object takes offline on both storage processors and issues a request for a health check, the physical drive object performs the mechanics of the health check, the result of which is detected by the provision drive object which determines whether put the drive back online.

If the drive is in a RAID group providing redundancy for data of the drive, during the health check the RAID group operates in a degraded mode, with rebuild logging as described above and satisfying I/O requests based on the redundancy. If the drive is not in a RAID group providing redundancy for data of the drive, the I/O fails because the drive cannot process any I/O. In particular, if the drive is in a non-redundant RAID group (e.g., having a RAID 0 RAID type or an individual disk RAID type), the RAID group is in a failed state while the heath check is occurring, and the RAID group cannot process I/O, with the result that all I/Os to the RAID group fail.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing drive problems in data storage systems, the method comprising:
   by a physical drive object, determining whether an I/O with a drive is able to be retried by another object;
   in response to determining that the I/O with the drive is able to be retried by another object, indicating how long another object should wait before retrying;
   keeping track of an overall retry time for the I/O; and
   if the overall retry time is excessive, taking the drive offline.

2. The method of claim 1, wherein a health check on the drive is initiated.

3. The method of claim 1, wherein the physical drive object monitors the time the drive has not been available for the I/O.

4. The method of claim 1, wherein the other object uses redundancy logic to process and complete I/Os while the drive is offline.

5. The method of claim 1, wherein self test and recovery actions are performed on the drive to try to bring the drive back to normal.

6. The method of claim 1, wherein a physical drive error is returned to the other object indicating action the other object should take.

7. The method of claim 1, wherein the physical drive object determines whether the drive has taken too long to respond to a set of retries of the I/O.

8. The method of claim 1, wherein rebuild logging is started after the drive is taken offline.

9. The method of claim 1, wherein an edge state between the other object and the physical drive object changes to indicate an I/O failure.

10. A system for use in managing drive problems in data storage systems, the system comprising:
    first logic determining, by a physical drive object, whether an I/O with a drive is able to be retried by another object;
    in response to determining that the I/O with the drive is able to be retried by another object, second logic indicating how long another object should wait before retrying;
    third logic keeping track of an overall retry time for the I/O; and
    fourth logic taking the drive offline if the overall retry time is excessive.

11. The system of claim 10, wherein a health check on the drive is initiated.

12. The system of claim 10, wherein the physical drive object monitors the time the drive has not been available for the I/O.

13. The system of claim 10, wherein the other object uses redundancy logic to process and complete I/Os while the drive is offline.

14. The system of claim 10, wherein self test and recovery actions are performed on the drive to try to bring the drive back to normal.

15. The system of claim 10, wherein a physical drive error is returned to the other object indicating action the other object should take.

16. The system of claim 10, wherein the physical drive object determines whether the drive has taken too long to respond to a set of retries of the I/O.

17. The system of claim 10, wherein rebuild logging is started after the drive is taken offline.

18. The system of claim 10, wherein an edge state between the other object and the physical drive object changes to indicate an I/O failure.

\* \* \* \* \*